(12) United States Patent
Yang et al.

(10) Patent No.: US 10,579,980 B2
(45) Date of Patent: Mar. 3, 2020

(54) METHOD AND APPARATUS FOR DISPLAYING TRANSACTION INFORMATION

(71) Applicant: Tencent Technology (Shenzhen) Company Limited, Shenzhen (CN)

(72) Inventors: Yiyong Yang, Shenzhen (CN); Chen Gong, Shenzhen (CN); Wenjing Zhang, Shenzhen (CN); Wenpeng Zhang, Shenzhen (CN); Jiawei Jiang, Shenzhen (CN); Guoguo Liu, Shenzhen (CN); Yaqin Guo, Shenzhen (CN); Leilei Li, Shenzhen (CN); Lin Huang, Shenzhen (CN); Fumin Zhou, Shenzhen (CN); Huashan Li, Shenzhen (CN); Zhiyong Lan, Shenzhen (CN); Jiangchao Wu, Shenzhen (CN); Jinming Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 742 days.

(21) Appl. No.: 15/173,224

(22) Filed: Jun. 3, 2016

(65) Prior Publication Data

US 2016/0283931 A1 Sep. 29, 2016

Related U.S. Application Data

(63) Continuation of application No. PCT/CN2014/093993, filed on Dec. 16, 2014.

(30) Foreign Application Priority Data

Dec. 24, 2013 (CN) .......................... 2013 1 0722689

(51) Int. Cl.
G06Q 20/00 (2012.01)
G06Q 20/22 (2012.01)
G06Q 30/06 (2012.01)

(52) U.S. Cl.
CPC ........... *G06Q 20/227* (2013.01); *G06Q 30/06* (2013.01)

(58) Field of Classification Search
CPC ........................... G06Q 20/227; G06Q 30/06
(Continued)

(56) References Cited

U.S. PATENT DOCUMENTS 8,266,018 B2 * 9/2012 Dearlove ........... G06Q 30/0633
705/26.8

FOREIGN PATENT DOCUMENTS

| CN | 1432950 A | 7/2003 |
|---|---|---|
| CN | 101853458 A | 10/2010 |

OTHER PUBLICATIONS

ISR and Written Opinion corresponding to PCT Application No. PCT/CN2014/093993, dated Mar. 18, 2015, (11p).
(Continued)

*Primary Examiner* — Daniel A Hess
(74) *Attorney, Agent, or Firm* — Brinks Gilson & Lione (57) ABSTRACT

The present disclosure discloses a method and an apparatus for displaying online transaction information. The method includes: displaying a first transaction information page on a terminal; sending first order information based on the first transaction information display page by a terminal to a server; sending first payment information by a server to the terminal in response to the first order information; and displaying a second transaction information display page including the first order information and the first payment information. The first order information is modifiable on the first and the second transaction information display page.

(Continued)

The first payment information includes a plurality of payment platform identifiers from which a user can select to complete the online transaction.

16 Claims, 5 Drawing Sheets

(58) Field of Classification Search
USPC ......................................................... 235/379
See application file for complete search history.

(56) References Cited

OTHER PUBLICATIONS

Office Action dated Dec. 30, 2016 for Chinese Application No. 201310722689.4, 6 pages.

* cited by examiner

FIG. 8

METHOD AND APPARATUS FOR DISPLAYING TRANSACTION INFORMATION

This application is a continuation of PCT Application No. PCT/CN2014/093993, filed on Dec. 16, 2014, which claims priority to Chinese Patent Application No. 201310722689.4, filed on Dec. 24, 2013, both of which are incorporated by reference in their entirety.

TECHNICAL FIELD

The present disclosure relates to Internet transactions, and in particular, to methods and apparatuses for displaying transaction information.

BACKGROUND

The statements in this section merely provide background information related to the present disclosure and may not constitute prior art.

At present, consumers may purchase goods or services through a variety of channels including online shopping. When a user uses a user terminal to shop online, the user may enter different transaction information through the user terminal, which in turn displays the different transaction information and sends the transaction information to, for example, a merchant server. The server, in response, sends payment information, which is displayed on the user terminal. The payment information may include the amount of payment required and a plurality of payment methods to complete the transaction. The user then pays the required payment amount by a selected payment method to the merchant.

In a typical method for displaying transaction information, a user terminal first displays an order information confirming page to a user. The user may confirm or modify the order information on the order information confirming page. After the user confirms the order information by clicking on a "confirm" button, the user terminal sends an order confirmation response to the server. The server, in response, generates an order based on the order information and sends payment information to the user terminal. The payment information includes an order number for the transaction and information about one or more payment types/platforms. After the user selects a payment type/platform, the user terminal sends the order number to the selected payment platform. The payment platform then sends a login page to the user terminal. The user enters a user account number and a user password on the login page. The user terminal then sends the order number, the user account number, and the user password to the selected payment platform for payment processing.

The typical online transaction method, however, has the problem of taking more time to modify an order. If the user wants to modify the order after the payment information page or the login page has been displayed on the user terminal, the user need to click an button, such as "return", "back", "edit" or "modify" to cause the user terminal to send a return request to the merchant server. The server, in response, sends the order information confirming page to the user terminal so that the order information confirming page can be re-displayed on the user terminal to allow the user to modify his/her order on the order information confirming page. After the user completes modifying the order information and confirms the order again by clicking on a "confirm" button, the user terminal sends an order confir-mation to the server. The same process for the merchant server to send a payment information page and for the payment platform to send a login page repeats. Therefore, it takes more time using the typical method to modify and complete an order.

SUMMARY

The present disclosure discloses a method and an apparatus for displaying online transaction information to facilitate order modification.

In one form, a method for displaying online transaction information, including: displaying a first transaction information page on a terminal; sending first order information based on the first transaction information display page by a terminal to a server; sending first payment information by a server to the terminal in response to the first order information; and displaying a second transaction information display page including the first order information and the first payment information. The first order information is modifiable on the first and the second transaction information display page.

In other features, the first order information is obtained from an order information display page, which is sent to a server, so that the server generates a first order according to the first order information. The first payment information is obtained from the server. The first payment information includes a plurality of payment platform identifiers. The display area is set at a predetermined position of the order information display page, and the first payment information is displayed in the display area. The order information and the payment information are displayed on the same page. When a user wants to modify an order, the user can directly modify the order on the second transaction information display page which includes both the first order information and the first payment information.

In another form, an apparatus for displaying online transaction information includes an information obtaining module, a sending module and a setting and display module. The information obtaining module obtains first order information from a terminal. The sending module sends the first order information to a server. The setting and display module sets a display area on a second transaction information display page. The obtaining module obtains first payment information when the server receives the first order information from the sending module. Both the first order information and the first payment information are displayed on the second transaction information display page and the first payment information is displayed in the display area. The first order information is editable on the second transaction information display page.

DRAWINGS

The drawings described herein are for illustration purposes only and are not intended to limit the scope of the present disclosure in any way.

In order that the invention may be well understood, there will now be described an embodiment thereof, given by way of example, reference being made to the accompanying drawing, in which.

DETAILED DESCRIPTION

The following description is merely exemplary in nature and is not intended to limit the present disclosure, application, or uses.

To make the objective, the technical solution, and advantages of the present invention clearer, embodiments of the present invention will be further described in detail in the following with reference to accompanying drawings.

First Embodiment

Figure 1:
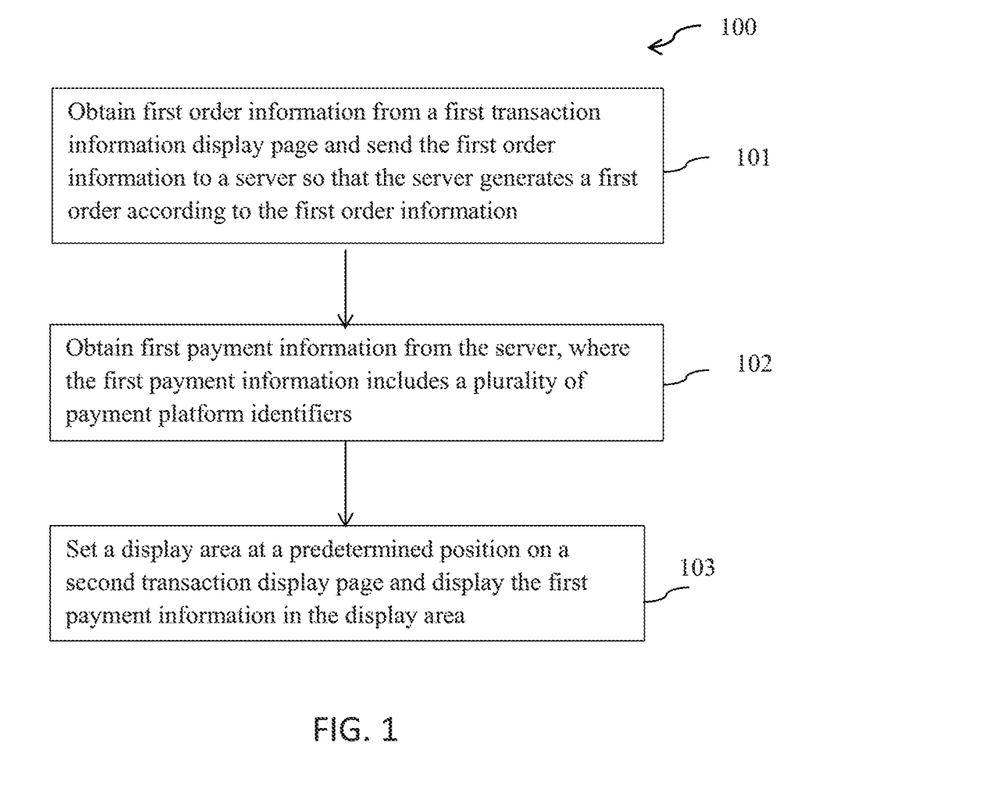
FIG. 1 is a flowchart of a method for displaying online transaction information according to a first embodiment of the present disclosure.

Referring to FIG. 1, a first embodiment of the present disclosure provides a method 100 for displaying online transaction information. The method 100 includes the steps of:

Step 101: obtaining, by a terminal 60 (or a user terminal), first order information from a first transaction information display page, and sending, by the terminal 60, the first order information to a server, so that the server generates a first order according to the first order information. The terminal 60 may be any electronic device that can be connected to the internet and display webpages returned by the server. For example, the terminal may include, but not be limited to, a computer, a smart phone, iPhone, iPad, tablet or a game console that can be connected to the internet. The server may be a backend server of a merchant's website or a backend server of an open platform.

Step 102: obtaining, by the terminal 60, first payment information from the server, where the first payment information includes a plurality of payment platform identifiers.

Step 103: setting a display area at a predetermined position of the second transaction information display page, and displaying the first payment information in the display area by the terminal 60. The first order information is displayed again on the second transaction display page, outside the display area and is an editable form so that the user can modify the order on the second transaction display page without returning to the first transaction information display page. The plurality of payment platform identifiers are displayed in the display area. The server also sends an order number for the specific order and a merchant identifier to the terminal. The order number may or may not be displayed on the second transaction information display page. The first order information is in an editable form on the second transaction information display page. Therefore, the user can modify the first order information even after the first payment information is displayed, thereby reducing the time to modify and complete an order.

Second Embodiment

Figure 2:
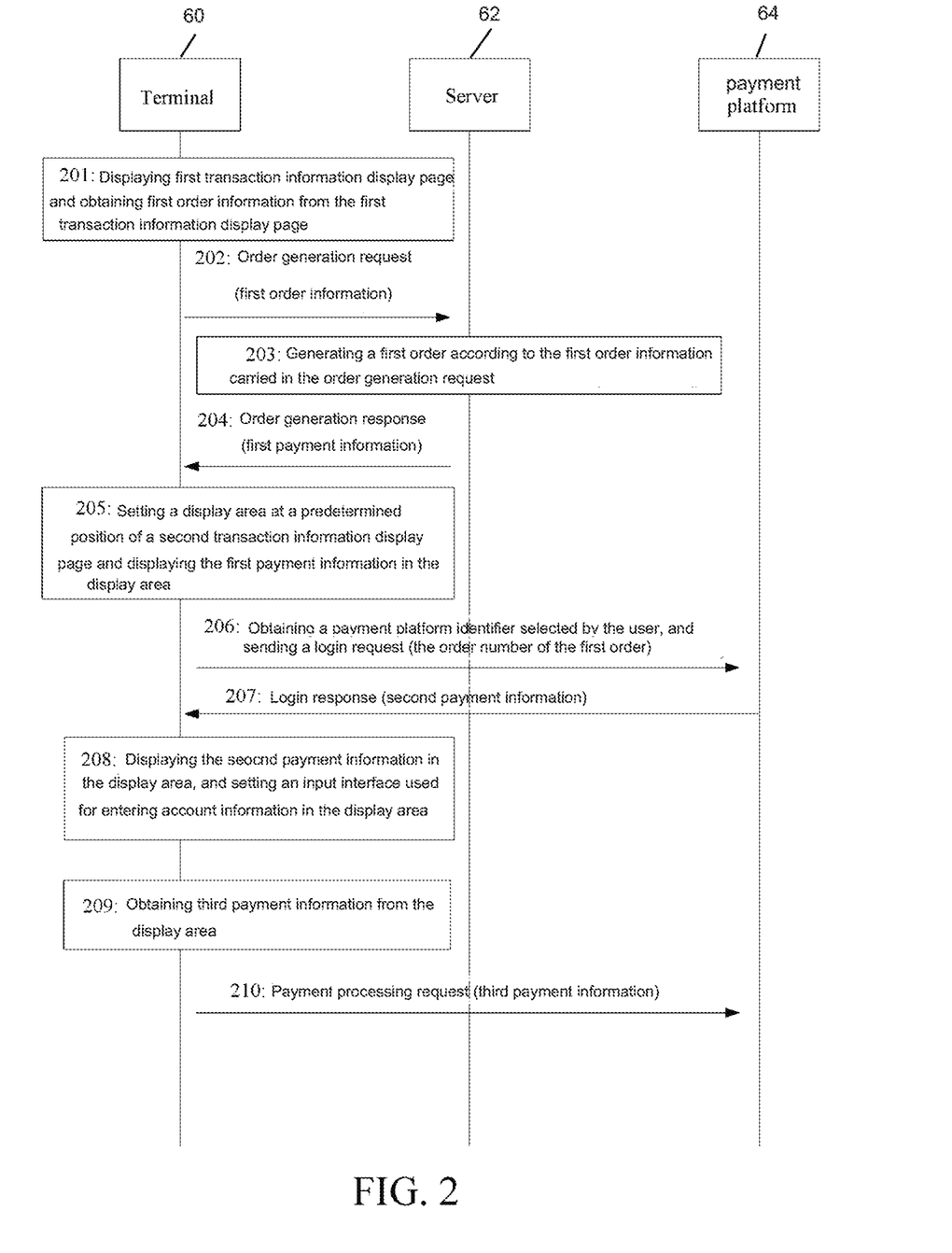
FIG. 2 is a schematic diagram showing a method for displaying online transaction information according to a second embodiment of the present disclosure.

Referring to FIG. 2, a second embodiment of the present disclosure provides a method for displaying online transaction information. When the user uses a terminal 60 to process an online transaction, a first transaction information display page 10 is displayed on the terminal 60, and first order information 12 is obtained from the first transaction information display page 10 by the terminal 60 in step 201.

Figure 3:
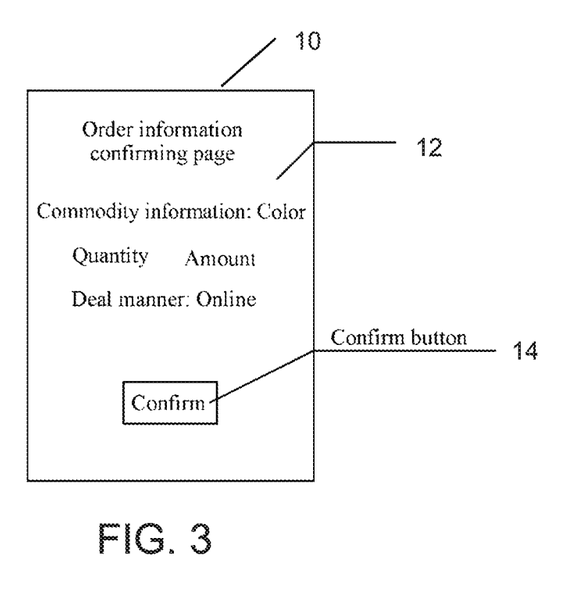
FIG. 3 is an exemplary schematic view of a first transaction information display page according to the second embodiment of the present disclosure.

As shown in FIG. 3, an exemplary first transaction information display page 10 displays the first order information 12 including, but not limited to, commodity description (or description of goods or service), quantity of the goods or services, amount of payment, and a deal manner (e.g., payment type), such as online payment). The first transaction information display page 10 also includes a "confirm" button 14. The user can modify the first order information 12 on the first transaction information display page 10. When the user clicks the "confirm" button 14, the terminal 60 sends an order generation request to the server 62. The terminal 60 may be any electronic device that can be connected to the internet and display webpages returned by the server. For example, the terminal may include, but not be limited to, a computer, a smart phone, iPhone, iPad, tablet or a game console that can be connected to the internet. The server may be a backend server of a merchant's website or a backend server of an open platform.

Referring back to FIG. 2, when the user clicks the "confirm" button 14, the terminal 60 sends an order generation request to the server 62 in step 202. The order generation request carries the first order information 12. Upon receipt of the order generation request from the terminal 60, the server 62 generates a first order according to the first order information 12 in step 203. The server 62 may designate an order number, such as "001", encapsulates the first order information to generate a first order, and stores the first order in the server 62. The server 62 then sends an order generation response to the terminal 60 in step 204. The order generation response carries the first order information, the first order number, and first payment information, among others. The first payment information includes a plurality of payment platform identifiers corresponding to the payment type contained in the first order information 12. For example, the first payment information may indicate that the payment type is an online payment, and thus the plurality of payment platform identifiers may correspond to a plurality of banks that are available for online payment. The server 62 may also include a merchant identifier that identifies a merchant account in the order generation response to the terminal 60.

Upon receipt of the order generation response, the terminal 60 displays a second transaction information display page 20, on which both the first order information 12 and the first payment information are displayed. A display area 16 is set at a predetermined position of the second transaction information display page 20 and the first payment information is displayed in the display area 16 in step 205. The order number that identifies the first order may optionally be displayed in the display area 16.

Figure 4:
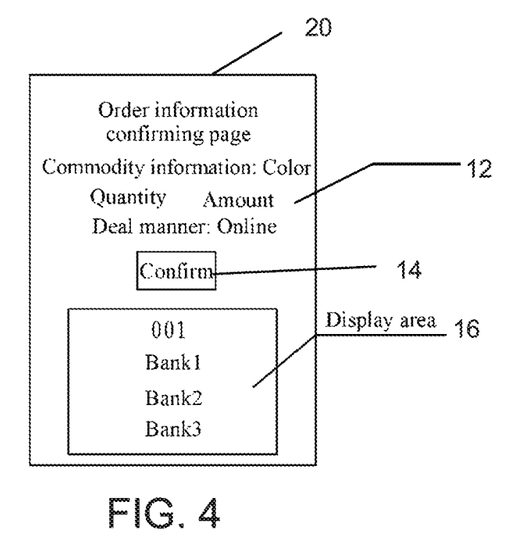
FIG. 4 is an exemplary schematic view of a second transaction information display page according to the second embodiment of the present disclosure.

Referring to FIG. 4, an exemplary second transaction information display page 20 is displayed on the terminal 60 after the user clicks the confirm button 14 on the first transaction information display page 10. The second transaction information display page 20 includes a display area

16 and a "confirm" button 14. The first order information 12 is again displayed on the second transaction information display page 20 outside the display area 16. The first payment information which includes a plurality of payment platform identifiers e.g., Bank1, Bank2, Bank3, is displayed in the display area 16. The order number, e.g., "001" for the first order may or may not be displayed in the display area 16.

The order generation response by the server 62 to the terminal 60 may also carry configuration parameters for configuring the display area 16. Therefore, the display area 16 can be set at a predetermined position on the second transaction information display page 20 for displaying the first payment information according to the configuration parameter.

When the server 62 obtains the information about the payment type, for example, online payment, from the first transaction information display page 10, the server 62 may retrieve from its own database corresponding payment platform identifiers, e.g., Bank1, Bank2, and Bank3 from a stored mapping between the payment type (e.g., online payment) and the payment platform identifiers (e.g., Bank1, Bank2, Bank3), as shown in Table 1 below.

TABLE 1

| Payment Type | Payment Platform Identifier |
| --- | --- |
| Online Payment | Bank 1, Bank 2, Bank 3 |
| . . . | . . . |

In addition, the server 62 may also retrieve from its own database a corresponding configuration parameter, such as "C1" from a stored mapping between the payment type and configuration parameters, as shown in Table 2 below.

TABLE 2

| Payment Type | Configuration Parameter |
| --- | --- |
| Type 1 | C1 |
| . . . | . . . |

Therefore, the server 62 may send first payment information, along with the configuration parameter to the terminal 60, so that the terminal 60 can display the first payment information on the second transaction information display page 20 according to the configuration parameter.

Different payment types may have different configuration parameters which define the length, width, and color of the display area 16. The second transaction information display page 20 may have its own color, layout, and style. Therefore, the pattern and layout of the display area 14 may need to be consistent with the layout or pattern of the second transaction information display page 20. For example, if the second transaction information display page 20 is displayed in red, the configuration parameter sent to the terminal 60 may include a red color parameter to be consistent with the second transaction information display page 20.

After the display area 16 is set at the predetermined position on the second transaction information display page 20 according to the configuration parameter, the terminal 60 may save and store the mapping between the payment type and the plurality of payment platform identifiers and the mapping between the payment type and the configuration parameters in the terminal 60. Therefore, when the user selects this payment type again in a future purchase, the terminal 60 can directly obtain the corresponding configuration parameter and platform identifiers from the stored mapping, rather than obtaining the information from the server 62.

Referring back to FIG. 2, after the second transaction information display page 20 is displayed on the terminal 60, the user can select a payment platform from the plurality of payment platform identifiers, e.g., Bank1, Bank2 and Bank3, displayed in the display area 16. When the user clicks one of the payment platform identifiers, e.g., Bank1, the terminal 60 detects and obtains the selected payment platform identifier in the display area 16 in real time. The terminal 60 then sends a login request to a payment platform 64 corresponding to the selected payment platform identifier in step 206. The login request carries the order number of the first order and a merchant identifier. After the payment platform 64 receives the login request from the terminal 60, the payment platform 64 generates a login response including the first order information and second payment information to the terminal 60 in step 207. Upon receipt of the login response, the terminal 60 displays a third transaction information display page including both the first order information and the second payment information in step 208. The second payment information is displayed in the display area 16 and includes prompt information used for prompting the user to enter account information including a user account number and user passwords for log in the payment platform. The login response also sets an input interface used for entering account information in the display area 16.

Figure 5:
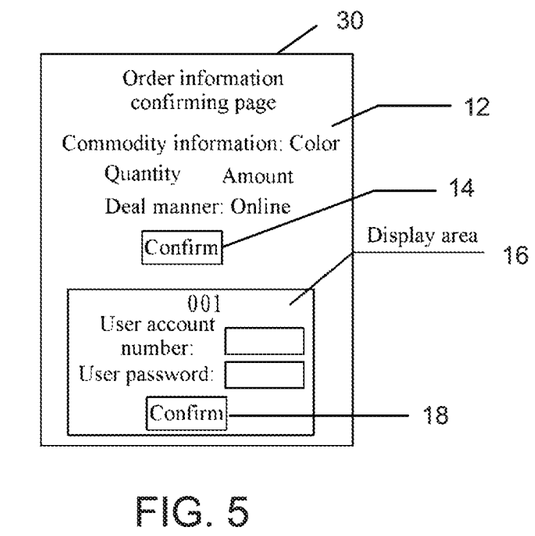
FIG. 5 is an exemplary schematic view of a third transaction information display page according to the second embodiment of the present disclosure.

As shown in FIG. 5, an exemplary third transaction information display page 30 displays the second payment information in the display area 16 and the first order information outside the display area 16. The second payment information includes prompt information used for prompting the user to enter account information including a user account number and user passwords for log in the payment platform 64. The first order number, e.g., "001" may optionally be displayed in the display area 16. The user account number input box, the user password input box, and a confirm button 18 are also displayed in the display area 16. A confirm button 14 may be optionally provided on the third transaction information display page 30 outside the display area 16. The confirmation button 14 is optional because the confirmation button 18 confirms both the first order information and the second payment information displayed on the same page.

Referring back to FIG. 2, after the user enters the account information including the user account number and the user password, the user terminal 60 obtains third payment information from the display area 16 in step 209. The terminal 60 detects the input interface used for entering the account information in the display area 16 in real time. When the terminal 60 detects that the user enters the user account number and the user passwords in the user account number input box and the user password input box in the input interface, the terminal 60 displays a fourth transaction information display page 40.

Figure 6:
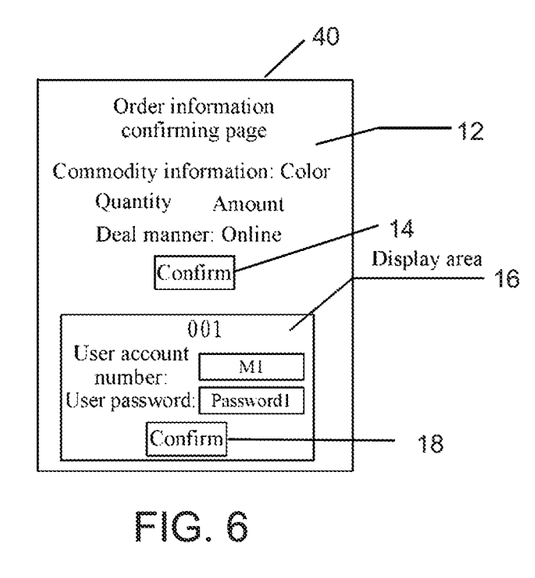
FIG. 6 is an exemplary schematic view of a fourth transaction information display page according to the second embodiment of the present disclosure.

Referring to FIG. 6, an exemplary fourth transaction information display page 40 includes the third payment information in the display area 16 and the first order information 12 outside the display area 16. The third payment information includes the user account number, e.g., "M1" and user password, e.g., "Password1" as show in FIG. 6. A confirm button 18 is provided in the display area 16. A confirm button 14 is optionally displayed outside the display area 16. The confirmation button 14 is optional because the confirmation button 18 is used to confirm both the first order information and the third payment information on the same page. When the user clicks the confirm button 18 inside the display area 16, the terminal 60 sends the third payment information to the selected payment platform for payment processing.

After receiving the payment processing request from the terminal 60, the payment platform 64 obtains the user account number and passwords carried in the payment processing request for verification based on a stored mapping between user account numbers and user passwords. If the user password from the payment processing request is not the same as that stored in the mapping, the payment platform 64 sends to the terminal 60 prompt information indicating that login fails. The terminal 60 displays the prompt information indicating that the login fails in the display area 16. If the user password from the payment processing request is the same as the one stored in the mapping, the payment platform 64 accesses a corresponding merchant account by using the merchant identifier which is carried in payment processing request from the terminal 60. The payment platform 64 has a stored mapping between the merchant identifiers and the merchant account numbers. Therefore, the payment platform 64 locates the merchant account by the merchant account identifier and locates the user account by using the user account information. The payment platform 64 transfers the payment amount from the user account to the merchant account.

Before the method proceeds to step 210, the user may modify the first order information 12 on any of the first, second, third and fourth transaction display pages 10, 20, 30, 40. The first order information 12 is displayed on the first, second, third and fourth transaction display page 10, 20, 30, 40 in an editable form to allow the user to edit and modify the first order information, while providing the requested payment information shown in the display area 16. The next page that will be displayed immediately after the user modifies his/her order information depends on what page the user is modifying his or her order.

For example, the user may modify his or her order without selecting a platform identifier (if the user is on the second transaction information display page) or without inputting user account information (if the user is on the third transaction information display page) and clicks the confirm button 14, the terminal 60 detects the order modification and sends an order change request carrying the second order information to the server 62. In response, the server 62 sends an order change response, updating the order information on the second or third transaction information display page the user is currently viewing. The user can then proceed to select the payment platform identifier (if the user is on the second transaction information display page) or enter the user account information (if the user is on the third transaction information display page).

Alternatively and preferably, the user may modify the first order information and select a platform identifier (if the user is on the second transaction information display page), or input user information (if the user is on the third or fourth transaction information display page) at the same time before he or she clicks the confirm button 18. As a result, the terminal 60 sends an order change request to the server 62 and simultaneously sends a login request (if the user modifies the order on the second transaction information display page) or a payment processing request (if the user modifies the order on the third or fourth transaction information display page) to the payment platform 64. Therefore, the method can directly proceeds to the next step or next page even though the user modifies the order information.

Figure 7:
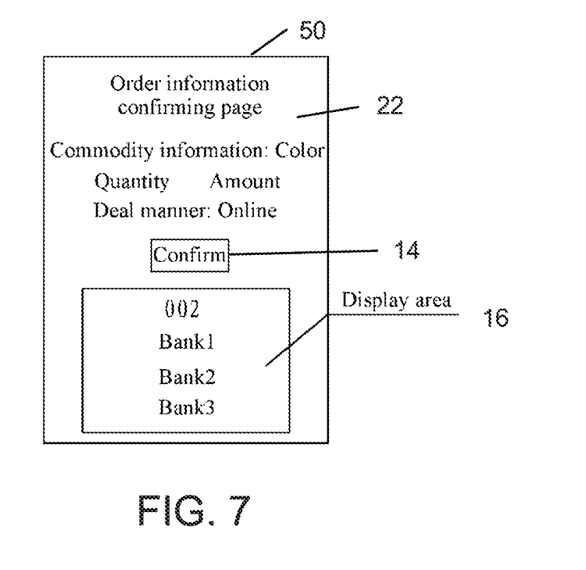
FIG. 7 is an exemplary schematic view of an updated second transaction information display according to the second embodiment of the present disclosure.

As shown in FIG. 7, an exemplary updated second transaction information display page 50 is shown to include the second order information and the first payment information. When the user changes the first order information to the second order information on the second transaction information display page 20, the second order information is obtained by the terminal 60 as the user modifies the order. In response to the request from the terminal 60, the server delete the first order, designate a new order number e.g., "002," for the order, encapsulates the second order information and the new order number to generate a second order. If the user does not select a payment identifier from the display area 16 and clicks the confirm button after modifying the order, the updated second transaction information display page 50 is displayed, showing the modified, second order information, and the new order number, e.g., "002" if the order number is set to be displayed in the display area 16. If the order number is not set to be displayed in the display area 16, the user did not see any changes after he or she clicks the confirm button 14.

On the other hand, if the user modifies the order and select the payment platform identifier on the second transaction information display page, after the user clicks the confirm button, the third transaction information display page will be displayed with the second, modified order information on the top and the second payment information including prompt information for user to enter account information in the display area 16.

Therefore, the first, second, third and fourth transaction information display pages are sequentially displayed without interruption even through the user modifies the order information on any of these pages. Therefore, the method of the present disclosure has increased efficiency in modifying and completing an online transaction.

Third Embodiment

Referring to FIG. 3, a third embodiment of the present disclosure provides an apparatus 300 that may be installed in, for example, a server or a web container (not shown) to facilitate communication between the terminal 60 and the server 62 and between the terminal 60 and the payment platform 64. The terminal 60 may be any electronic device that can be connected to the internet and display webpages returned by the server. For example, the terminal may include, but not be limited to, a computer, a smart phone or a game console that can be connected to the internet. The server may be a backend server at a merchant's website or a server associated with an open platform.

Figure 8:
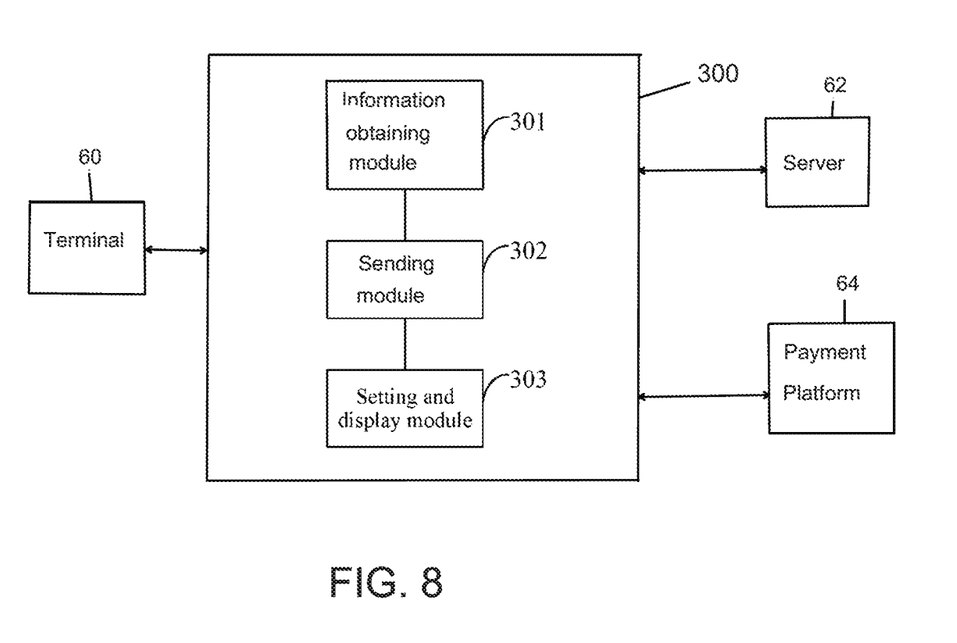
FIG. 8 is a schematic structural diagram of an apparatus for displaying transaction information according to a third embodiment of the present disclosure.

The apparatus 300 can obtain order information, payment information etc. from the terminal 60, the server 62 and the payment platform 64 and then sends the order information and the payment information to the right destination.

The apparatus 300 includes an information obtaining module 301, a sending module 302, and a setting and display module 303. The information obtaining module 301 obtains various information from the terminal 60, the server 62 and the payment platform 64. The sending module 302 sends the various information obtained by the information obtaining module 301 to an appropriate destination, such as the terminal 60, the server 62, and the payment platform 64. The setting and display module 303 sets a display area 16 on the second, third, fourth transaction information display pages 20, 30, 40 or updated second, third and fourth transaction information display pages when the order is modified.

More specifically, the information obtaining module 301 may obtain first or second order information from the terminal 60, obtain first payment information and first or second order number from the server 62, obtain second payment information from the payment platform 64, and obtain third payment information from the terminal 60. The sending module 302 sends the first or second order information obtained by the information obtaining module 301 to the server 62, sends the first payment information and the first or second order number obtained by the first or second order information to the terminal 60, sends the second and third payment information obtained by the obtaining module 301 to the payment platform 64. The setting and display module 303 obtains a configuration parameter from the server 62 for setting a display area 16 at the predetermined position of the first, second, third transaction information display pages 10, 20, 30, 40 or an updated first, second, third transaction information display pages if order is modified, according to the configuration parameter.

The information obtaining module 301, the sending module 302 and the setting and display module 303 may be a computer readable storage medium that stores programs for executing the various information obtaining, sending, setting and displaying steps.

The first and second order information, the first and second order number, the first, second and third payment information, the first, second, third transaction information display pages 10, 20, 30 have been described in the first and second embodiments and in connection with FIGS. 1 to 7 and thus the description thereof is omitted therein.

All or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present invention. Any modification, equivalent replacement, or improvement made within the spirit and principle of the present invention shall fall within the protection scope of the present disclosure.

The invention claimed is:

1. A method for displaying and processing online transaction information by a terminal, comprising:
   displaying a first transaction page on the terminal comprising a confirmation prompt and transaction information, wherein the transaction information comprises an order quantity and an order amount;
   sending, by the terminal, an online purchase order based on the transaction information to a server upon confirmation of the transaction information by user activation of the confirmation prompt;
   receiving an order number, a list of payment modes, and a set of display parameters mapped with the list of payment modes sent by the server in response to receiving and generating the online purchase order;
   creating a second transaction page sequential in time to the first transaction page for displaying the transaction information, the order number, and the list of payment modes received from the server, wherein the order quantity of the transaction information is directly modifiable on the second transaction page after the online purchase order has already been generated, wherein the list of payment modes are displayed according to the set of display parameters;
   storing the set of display parameters mapped with the list of payment modes locally for retrieval in future online transactions;
   obtaining a modified order quantity while the second transaction page is being displayed;
   obtaining a selection of one payment mode among the list of payment modes;
   simultaneously sending the selection of payment mode and the modified order quantity to the server for both modification of the online purchase order according to the modified order quantity and for setting a payment mode to the selected payment mode for completing the modified online purchase order; and
   receiving an modified order number from the server in response to receiving the selection of payment mode and the modified order quality.

2. The method according to claim 1, wherein the list of payment modes comprises a plurality of payment platform identifiers.

3. The method according to claim 2, wherein simultaneously sending the selection of payment mode and the modified order quantity comprises simultaneously sending an order modification request to the server and a login request to a payment platform associated with the selected payment platform identifier.

4. The method according to claim 3, further comprising receiving a first payment information by the payment platform to the terminal and displaying on the terminal a third transaction page sequential in time to the second transaction page including the modified transaction information and the first payment information.

5. The method according to claim 4, wherein the order quantity of the modified transaction information is further modifiable on the third transaction page.

6. The method according to claim 4, wherein the first payment information includes prompt information for prompting the user to enter account information.

7. The method according to claim 6, further comprising setting an input interface on the third transaction page to allow the user to enter the account information through the input interface.

8. The method according to claim 7, further comprising displaying a fourth transaction page sequential to the third transaction page including the modified transaction information and a second payment information, wherein the second payment information includes the account information entered by the user from the third transaction page.

9. The method according to claim 1, further comprising setting a display area at a predetermined position on the second transaction page, wherein the list of payment modes is displayed in the display area and the transaction information is displayed outside the display area.

10. The method according to claim 9, wherein the set of display parameters comprise configuration parameter for setting a display area of the list of payment modes within the second transaction page.

11. A terminal device comprising a memory and a processor, wherein the processor, when executing instructions from the memory, is configured to cause the terminal to:
   display a first transaction page on a terminal comprising a confirmation prompt and transaction information, wherein the transaction information comprises an order quantity and an order amount;
   send an online purchase order based on the transaction information to a server upon confirmation of the transaction information by user activation of the confirmation prompt;
   receive an order number, a list of payment modes, and a set of display parameters mapped with the list of payment modes sent by the server in response to receiving and generating the online purchase order;

create a second transaction page sequential in time to the first transaction page for displaying the transaction information, the order number, and the list of payment modes received from the server, wherein the order quantity of the transaction information is directly modifiable on the second transaction page after the online purchase order has already been generated, wherein the list of payment modes are displayed according to the set of display parameters;

store the set of display parameters mapped with the list of payment modes locally for retrieval in future online transactions;

obtain a modified order quantity while the second transaction page is being displayed;

obtain a selection of one payment mode among the list of payment modes;

simultaneously send the selection of payment mode and the modified order quantity to the server for both modification of the online purchase order according to the modified order quantity and for setting a payment mode to the selected payment mode for completing the modified online purchase order; and receive an modified order number from the server in response to receiving the selection of payment mode and the modified order quality.

12. The terminal device of claim 11, wherein the list of payment modes comprises a plurality of payment platform identifiers.

13. The terminal device of claim 12, wherein the processor, when executing the instruction to cause the terminal device to simultaneously send the selection of payment mode and the modified order quantity, is configured to cause the terminal device to simultaneously send an order modification request to the server and a login request to a payment platform associated with the selected payment platform identifier.

14. The terminal device of claim 13, wherein the processor, when executing the instructions, is configured to cause the terminal device to further receive a first payment information by the payment platform to the terminal and displaying on the terminal a third transaction page sequential in time to the second transaction page including the modified transaction information and the first payment information.

15. The terminal device of claim 14, wherein the order quantity of the modified transaction information is further modifiable on the third transaction page.

16. The terminal device of claim 14, wherein the first payment information includes prompt information for prompting the user to enter account information.

* * * * *